United States Patent [19]

Kim

[11] Patent Number: 5,774,596

[45] Date of Patent: Jun. 30, 1998

[54] ADAPTIVE CONTOUR CODING METHOD FOR ENCODING A CONTOUR IMAGE IN A VIDEO SIGNAL

[75] Inventor: Jin-Hun Kim, Seoul, Rep. of Korea

[73] Assignee: Daewoo Electronics Co., Ltd., Seoul, Rep. of Korea

[21] Appl. No.: 669,660

[22] Filed: Jun. 24, 1996

[30] Foreign Application Priority Data

May 8, 1996 [KR] Rep. of Korea .................. 1996-14969

[51] Int. Cl.[6] .............................. G06K 9/46; G06K 9/36; H04N 5/14
[52] U.S. Cl. .......................... 382/242; 382/194; 382/203; 348/26
[58] Field of Search .................................... 382/242, 241, 382/206, 194, 197, 203, 199, 243, 240, 266, 250; 348/26; 358/458, 462

[56] References Cited

U.S. PATENT DOCUMENTS 5,572,605  11/1996  Toraichi .................................. 382/242

FOREIGN PATENT DOCUMENTS

| 0586219 | 3/1994 | European Pat. Off. ........ G06F 15/64 |
| 0708563 | 4/1996 | European Pat. Off. ......... H04N 7/24 |
| 60-075975 | 4/1985 | Japan .................................. G06K 9/48 |
| 2229337 | 9/1990 | United Kingdom ........... H04N 1/411 |

OTHER PUBLICATIONS

Gonzalez R C et al., "Digital Image Processing", London, UK, Addison–Wesley, 1977, pp. 392–411.

*Primary Examiner*—David K. Moore
*Assistant Examiner*—Wenpeng Chen
*Attorney, Agent, or Firm*—Anderson, Kill & Olick, P.C.

[57] ABSTRACT

A contour coding method adaptively encodes a contour image in a video frame based on the size and complexity of the contour image in order to improve the quality of a reconstructed contour image. First, the size and complexity of the contour image inputted are determined. Simultaneously, the contour image is encoded by using a first and a second contour coding methods to thereby provide first and second coded contour data, respectively. And, the first or the second coded contour data is selected as encoded contour image data based on the size and complexity of the contour image.

8 Claims, 3 Drawing Sheets

ADAPTIVE CONTOUR CODING METHOD FOR ENCODING A CONTOUR IMAGE IN A VIDEO SIGNAL

FIELD OF THE INVENTION

This invention relates to a video signal coding method; and, more particularly, to a method for adaptively encoding a contour image in a video frame of a video signal based on the size and complexity of the contour image.

DESCRIPTION OF THE PRIOR ART

In digital video systems such as video-telephone, teleconference and high definition television systems, a large amount of digital data is needed to define each video frame signal since the video frame signal comprises a sequence of digital data referred to as pixel values. Since, however, the available frequency bandwidth of a conventional transmission channel is limited, in order to transmit the substantial amount of digital data therethrough, it is necessary to compress or reduce the volume of data through the use of various data compression techniques, especially, in the case of such low bit-rate video signal encoders as video-telephone and teleconference systems.

One of such techniques for encoding video signals for a low bit-rate encoding system is the so-called object-oriented analysis-synthesis coding technique(see, Michael Hötter, "Object-Oriented Analysis-Synthesis Coding Based on Moving Two-Dimensional Objects", *Signal Processing: Image Communication*, 2, No.4, pp. 409–428 (December, 1990)).

According to the object-oriented analysis-synthesis coding technique, an input video image is divided into objects and three sets of parameters for defining the motion, the contour and pixel data of each object are processed through different encoding channels.

In processing a contour image of an object, contour information is important for the analysis and synthesis of the shape of the object. One of the classical coding schemes for representing the contour information is a chain coding technique. In the chain coding technique, although there is no loss in the contour information, the amount of bits required is substantially large.

To overcome the latter drawback, there have been proposed several techniques to approximate a contour such as a polygonal approximation and a B-spline approximation. Compared with the polygonal approximation, it is possible to obtain a more accurate representation in case of the B-spline approximation, wherein a high-order polynomial is used to reduce the approximation error. The B-spline approximation technique, however, results in an increased overall computational complexity of the video encoder.

One of the techniques introduced to ameliorate such problem of increased computational complexity is a contour coding technique employing a polygonal approximation and a discrete sine transform(DST). This technique is described in a commonly owned copending application, U.S. Ser. No. 08/520,204, filed on Aug. 28, 1995 and entitled "IMPROVED CONTOUR APPROXIMATION METHOD FOR REPRESENTING A CONTOUR OF AN OBJECT". However, when dealing with a complex contour image, the above technique employing the polygonal approximation and DST may yield a reconstructed image that may still have considerable discrepancies from its original contour image.

SUMMARY OF THE INVENTION

It is, therefore, a primary object of the invention to provide a method for use in an encoder which appropriately encodes a contour image in a video frame of a video signal based on the size and the complexity of the contour image to thereby improve the quality of a reconstructed contour image in the video frame.

In accordance with the present invention, there is provided a method for adaptively encoding a contour image of an object included in a video frame of a video signal wherein the video frame is divided into a multiplicity of blocks, each of which includes K×L pixels with K and L being positive integers, respectively, and the contour image consists of a plurality of contour pixels, the contour pixels representing pixels located on the contour, said method comprising the steps of: (a) detecting the number of contour blocks, each contour block including one or more contour pixels therein; (b) calculating curvatures of the contour at selected contour pixels, thereby determining a mean curvature based on the calculated curvatures wherein a curvature of the contour at a selected contour pixel denotes an angle change between two lines that pass therethrough, each of the two lines being drawn through the selected contour pixel and another contour pixel located a predetermined number of contour pixels away therefrom in a direction along the contour; (c) comparing the number of contour blocks and the mean curvature with a first and a second predetermined threshold values, respectively; (d) coding the contour image by using a first contour coding method if the number of contour blocks is smaller than the first predetermined threshold value and the mean curvature is greater than or equal to the second predetermined threshold value; and (e) coding the contour image by using a second contour coding method if the number of contour blocks is larger than or equal to the first predetermined threshold value or the mean curvature is smaller than the second predetermined threshold value, wherein the first contour coding method is chosen to be capable of representing the contour image more precisely than the second contour coding method.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
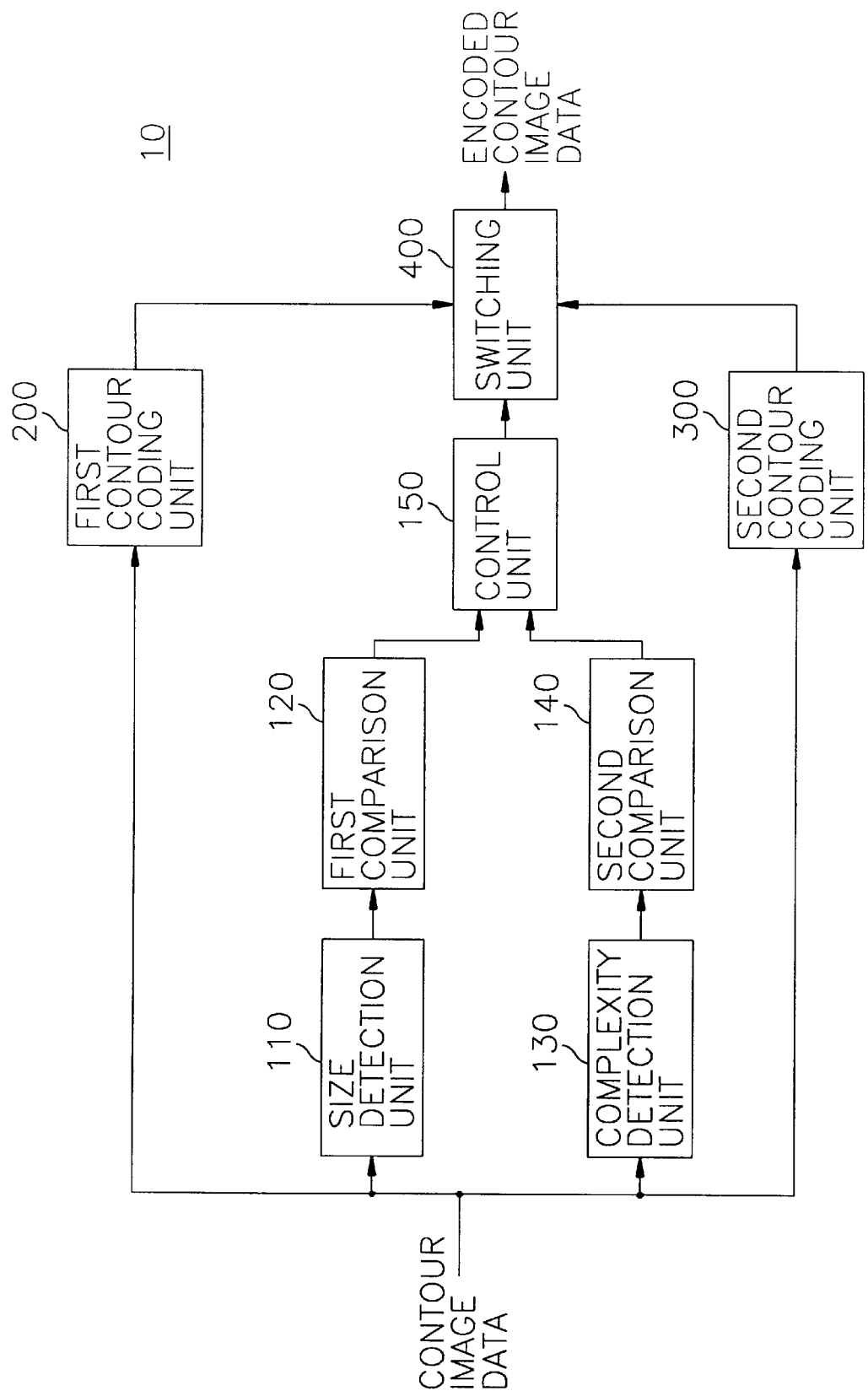
FIG. 1 represents a block diagram of a contour coding apparatus in accordance with the present invention.

Referring to FIG. 1, there is shown a block diagram of a contour coding apparatus 10 for adaptively encoding a contour image of an object in a video frame of a video signal in accordance with the present invention.

Contour image data of an object included in the video frame is inputted to a size detection unit 110, a complexity detection unit 130, a first contour coding unit 200, and a second contour coding unit 300 in parallel, wherein the contour image data represents position information of contour pixels, the contour pixels representing pixels located on the contour.

Figure 2:
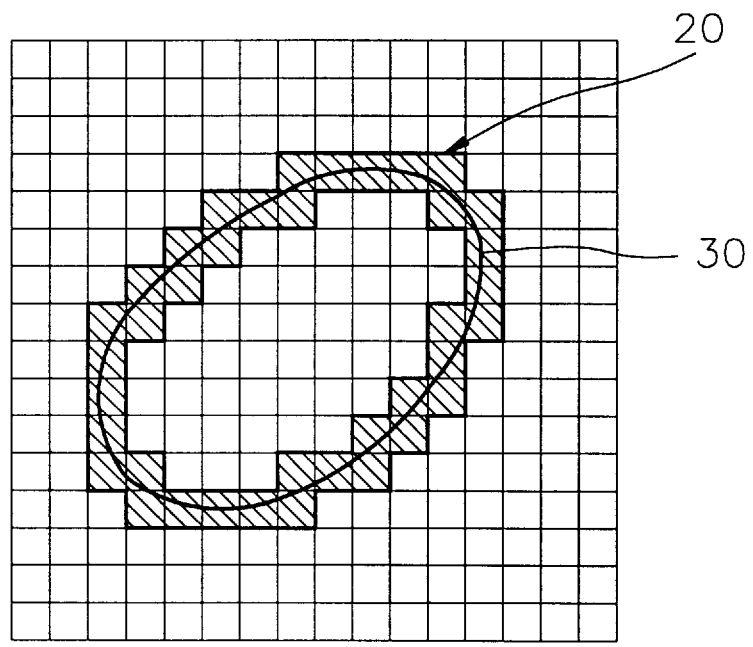
FIG. 2 provides an illustrative diagram, for defining contour blocks.

At the size detection unit 110, the video frame is first divided into a plurality of blocks of K×L pixels with K and L being positive integers, respectively, and the number of contour blocks is determined for the contour, each contour block denoting a block containing therein at least one contour pixel. That is, as shown in FIG. 2, each block located in a shaded region 20 is overlapping with a portion of a contour 30 in the video frame 40 and these blocks are referred to as contour blocks.

Then, the number of contour blocks is inputted to a first comparison unit 120, wherein the number is compared with a first predetermined threshold value TH1. An output from the first comparison unit 120 is a logic high signal if the number is greater than or equal to the first threshold value TH1, i.e., if the size of the contour image is considered as being large; and a logic low signal, if otherwise.

In the meanwhile, the complexity detection unit 130 calculates curvatures at selected contour pixels and determines a mean curvature for the contour.

Figure 3:
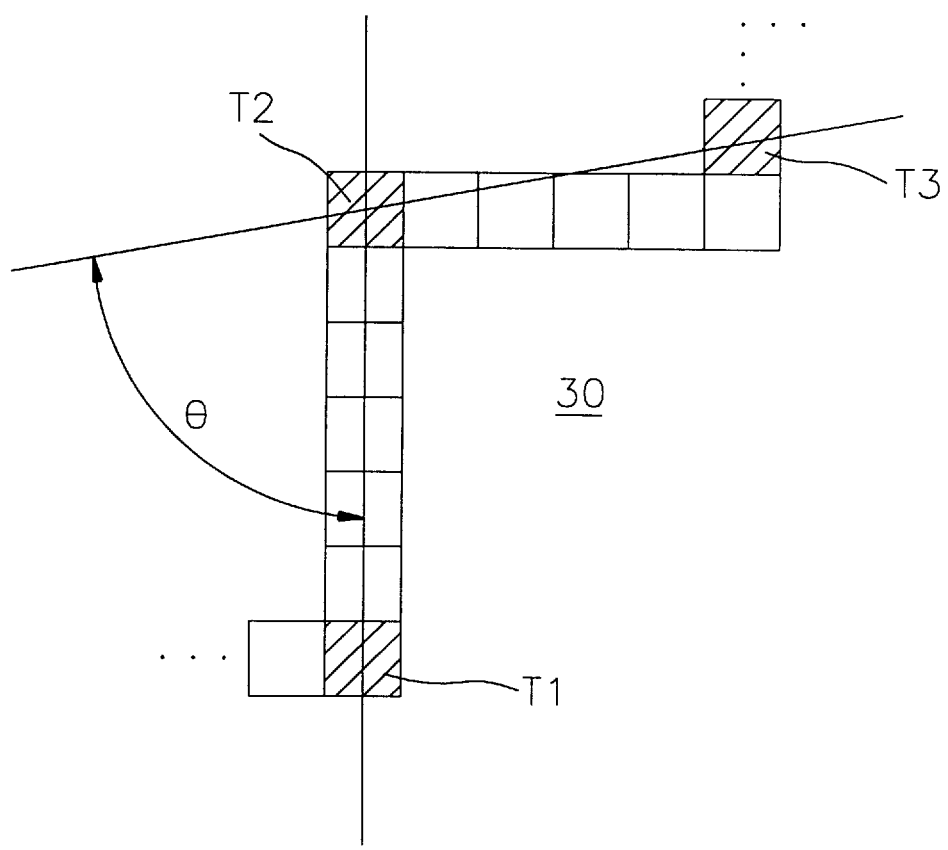
FIG. 3 offers an explanatory diagram describing a curvature calculation process.

Referring to FIG. 3, there is shown an explanatory diagram depicting a curvature calculation process carried out at the complexity detection unit 130. First, one contour pixel, e.g., T2, is selected as a target pixel and its two Nth, e.g., 6th, neighboring contour pixels, e.g., T1 and T3, on both sides of the contour 30 are determined. Then, two lines are drawn through the target pixel T2 and its two Nth neighboring contour pixels T1 and T3. An angle change between the two lines that pass through the target pixel T2 is defined as the curvature of the contour at the target pixel T2. In the preferred embodiment of the invention, all the contour pixels are selected as the target pixels. However, in order to reduce the calculation burden, every Pth contour pixels may be selected as the target pixels, P being an integer larger than 1. Thereafter, curvatures of the contour at the remaining target pixels are calculated in the same manner as described above.

As the curvatures of the contour at all the target pixels are determined, the mean curvature of the contour may be calculated as follows:

$$C_M = \frac{1}{M} \sum_{i=1}^{M} \theta_i^2 \qquad \text{Eq. 1}$$

wherein $C_M$ denotes the mean curvature; M is the number of target pixels; and $\theta_i$ represents a curvature at each of the target pixels.

Referring back to FIG. 1, at a second comparison unit 140, the mean curvature $C_M$ determined at the complexity detection unit 130 is compared with a second predetermined threshold value TH2. The second comparison unit 140 provides a control unit 150 with a logic low signal if the mean curvature $C_M$ is greater than or equal to the second threshold value TH2, i.e., if the contour image is determined as being rather complex; and a logic high signal, if otherwise.

At the control unit 150, the signals from the two comparison units 120 and 140 are logically combined, and a logic low control signal is generated to a switching unit 400 if both of the signals from the comparison units 120 and 140 are logic low, i.e., if the contour is regarded small and complex. Otherwise, i.e., if the contour image is large or simple, a logic high control signal is generated to the switching unit 400.

Meantime, the contour image data is encoded at the first and second contour coding units 200 and 300.

Specifically, at the first contour coding unit 200, the contour image data is encoded, e.g., by using a conventional chain coding method and fed to the switching unit 400 as first encoded data, wherein the direction vectors between successive contour pixels are encoded. As an example, a commonly used chain coding scheme employs eight direction vectors, which can be coded by 3-bit code words. In the chain coding, typically, the start contour pixel address information is followed by a string of code words.

On the other hand, at the second contour coding unit 300, the contour image data is encoded, e.g., by using the method employing the polygonal approximation and the DST and resultant encoded data is provided to the switching unit 400 as second encoded data, wherein the contour image data is first approximated by the polygonal approximation; errors between the original contour image and the approximated contour image are calculated by using DST; the result of the polygonal approximation is encoded by using, e.g., a fixed length code without compression; and the result of the DST is then encoded by using, e.g., a binary arithmetic code of JPEG(Joint Picture Experts Group). Details of the polygonal approximation and the DST techniques are disclosed in the afore-mentioned U.S. Ser. No. 08/520,204, filed on Aug. 28, 1995 and entitled "IMPROVED CONTOUR APPROXIMATION METHOD FOR REPRESENTING A CONTOUR OF AN OBJECT", which is incorporated herein by reference.

In response to the control signal provided from the control unit 150, the switching unit 400 selects, as encoded contour image data, either the first or the second encoded data. That is, if the logic low control signal is applied thereto, the first encoded data is transmitted to a transmitter(not shown) for the transmission thereof, and the second encoded data is transmitted if the control signal is logic high.

As a result, the smaller and more complex contour images in the video frame are selected to be encoded at the first contour coding unit 200 by the chain coding method, while the larger or the simpler contour images in the video frame are chosen to be encoded at the second contour coding unit 300 by the contour coding method employing the polygonal approximation and DST.

While the present invention has been described with respect to certain preferred embodiments only, other modifications and variations may be made without departing from the spirit and scope of the present invention as set forth in the following claims.

What is claimed is:

1. A method for adaptively encoding a contour image of an object included in a video frame of a video signal wherein the video frame is divided into a multiplicity of blocks, each of the blocks having K×L pixels with K and L being positive integers, respectively, and the contour image consists of a plurality of contour pixels, the contour pixels representing pixels located on a contour, said method comprising the steps of:

(a1) coding the contour image by using a first and a second contour coding methods to thereby provide first and second coded contour data, respectively, the first coded contour data being capable of representing the contour image more precisely than the second coded contour data;

(b1) detecting the number of contour blocks, each of the contour blocks including one or more contour pixels therein;

(c1) comparing the number of contour blocks with a first predetermined threshold value;

(d1) calculating curvatures of the contour at selected contour pixels to thereby determine a mean curvature based on the calculated curvatures wherein a curvature of the contour at a selected contour pixel denotes an angle change between two lines that pass therethrough, each of the two lines being drawn through said selected contour pixel and another contour pixel located a predetermined number of contour pixels away therefrom in one direction along the contour;

(e1) comparing the mean curvature with a second predetermined threshold value; and (f1) selecting the first coded contour data if the number of contour blocks is smaller than the first predetermined threshold value and the mean curvature is greater than or equal to the second predetermined threshold value and selecting the second coded contour data if otherwise, to thereby provide the selected coded contour data as encoded contour image data.

2. The method according to claim 1, wherein said first contour coding method is a chain coding method.

3. The method according to claim 2, wherein said second contour coding method includes a polygonal approximation and a discrete sine transform.

4. The method according to claim 3, wherein said mean curvature is defined as:

$$C_M = \frac{1}{M} \sum_{i=1}^{M} \theta_i^2$$

wherein $C_M$ denotes the mean curvature; M is the number of selected contour pixels; and $\theta_i$ represents a curvature at each of the selected contour pixels.

5. A method for adaptively encoding a contour image of an object included in a video frame of a video signal wherein the video frame is divided into a multiplicity of blocks, each of the blocks having K×L pixels with K and L being positive integers, respectively, and the contour image consists of a plurality of contour pixels, the contour pixels representing pixels located on a contour, said method comprising the steps of:

(a2) detecting the number of contour blocks, each of the contour blocks including one or more contour pixels therein;

(b2) calculating curvatures of the contour at selected contour pixels to thereby determine a mean curvature based on the calculated curvatures wherein a curvature of the contour at a selected contour pixel denotes an angle change between two lines that pass; therethrough, each of the two lines being drawn through said selected contour pixel and another contour pixel located a predetermined number of contour pixels away therefrom in one direction along the contour;

(c2) comparing the number of contour blocks and the mean curvature with a first and a second predetermined threshold values, respectively;

(d2) coding the contour image by using ea first contour coding method if the number of contour blocks is smaller than the first predetermined threshold value and the mean curvature is greater than or equal to the second predetermined threshold value; and (e2) coding the contour image by using a second contour coding method if the number of contour blocks is larger than or equal to the first predetermined threshold value or the mean curvature is smaller than the second predetermined threshold value, wherein the first contour coding method is chosen to be capable of representing the contour image more precisely than the second contour coding method.

6. The method according to claim 5, wherein said first contour coding method is a chain coding method.

7. The method according to claim 6, wherein said second contour coding method includes a polygonal approximation and a discrete sine transform.

8. The method according to claim 7, wherein said mean curvature is defined as:

$$C_M = \frac{1}{M} \sum_{i=1}^{M} \theta_i^2$$

wherein $C_M$ denotes the mean curvature; M is the number of selected contour pixels; and $\theta_i$ represents a curvature at each of the selected contour pixels.

* * * * *

UNITED STATES PATENT AND TRADEMARK OFFICE
CERTIFICATE OF CORRECTION

PATENT NO. : 5,774,596
DATED : June 30, 1998
INVENTOR(S) : Jin-Hun Kim

It is certified that error appears in the above-identified patent and that said Letters Patent is hereby corrected as shown below:

Title page, item [30], under Foreign Application Priority Data should read -- May 8, 1996 [KR] Rep. of Korea 96-14969--

Signed and Sealed this

Eighth Day of September, 1998

*Attest:*

BRUCE LEHMAN

*Attesting Officer*  *Commissioner of Patents and Trademarks*